United States Patent [19]
Tortola et al.

[11] Patent Number: 5,130,907
[45] Date of Patent: * Jul. 14, 1992

[54] LIGHT APPARATUS FOR USE WITH A COMPACT COMPUTER VIDEO SCREEN

[75] Inventors: Angelo Tortola, Lexington; Robert Howitt, Leominster, both of Mass.

[73] Assignee: Curtis Manufacturing Company, Inc., Jaffrey, N.H.

[*] Notice: The portion of the term of this patent subsequent to Feb. 25, 2009 has been disclaimed.

[21] Appl. No.: 815,822

[22] Filed: Jan. 29, 1992

Related U.S. Application Data

[63] Continuation of Ser. No. 678,265, filed as PCT/US90/03966, Jul. 11, 1990, Pat No. 5,091,832.

[51] Int. Cl.5 .............................................. F21V 33/00
[52] U.S. Cl. ...................................... 362/109; 362/84; 362/191; 362/234; 362/396; 273/148 B; 273/434; 340/700
[58] Field of Search ............... 362/109, 191, 84, 85, 362/23, 28, 234, 253, 396; 273/855, 85 R, 148 B, 237, 269, 434; 368/159, 188, 241, 281, 321; 340/700, 705; 248/918; 359/48, 49, 83

[56] References Cited

U.S. PATENT DOCUMENTS

| | | | |
|---|---|---|---|
| 4,359,222 | 11/1982 | Smith, III et al. | 359/83 X |
| 4,772,986 | 9/1988 | McNemor | 362/28 X |
| 4,893,222 | 1/1990 | Mintzer | 362/109 |
| 5,091,832 | 2/1992 | Tortola et al. | 362/109 |

*Primary Examiner*—Stephen F. Husar
*Attorney, Agent, or Firm*—Richard P. Crowley

[57] ABSTRACT

A portable, compact, battery-operated light apparatus for use with a compact computer game having a LCD video screen for enhancing the visibility of the LCD screen in use, which light apparatus comprises a body with a battery compartment and having side panels which define an open viewing space and lights provided in the body element to provide for indirect lighting of the viewing space, the light apparatus comprising a portable, compact, battery-powered light apparatus and which includes ridges on the light apparatus which snap in a releasable manner onto the grooves in a compact computer game video system to releasably secure the light apparatus in position over the LCD video screen of the compact game system.

20 Claims, 3 Drawing Sheets

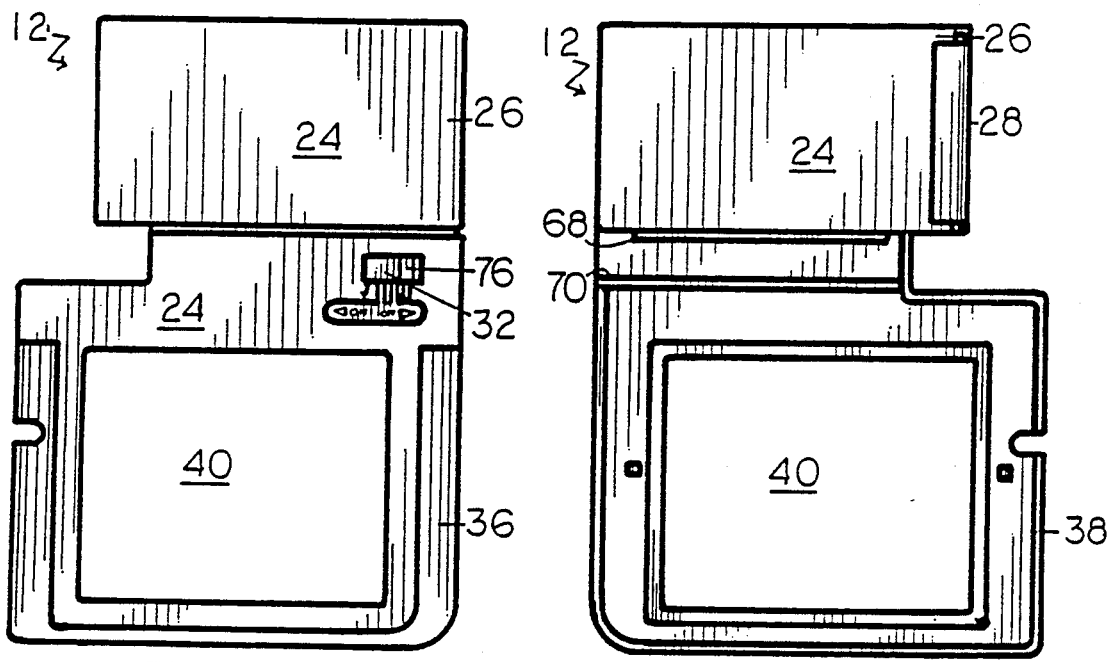
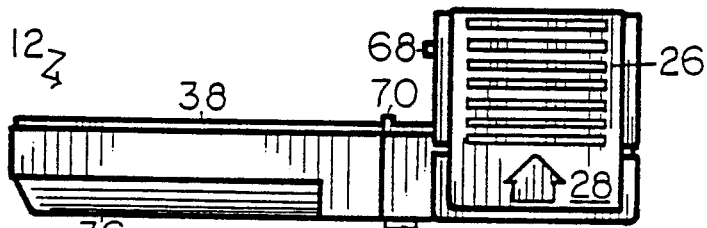
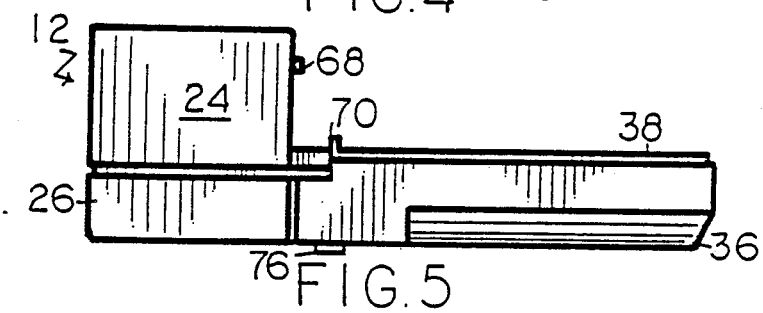
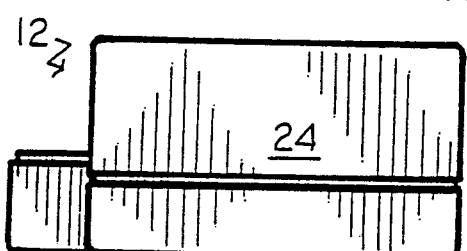
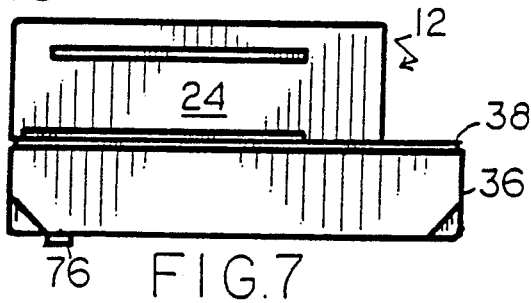

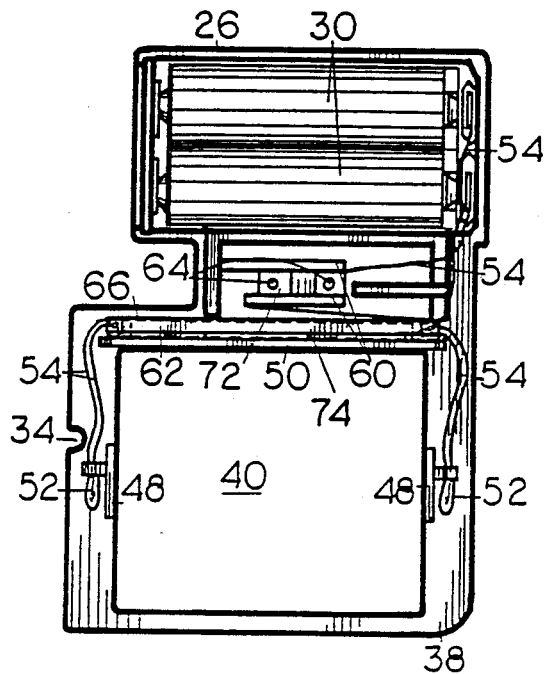
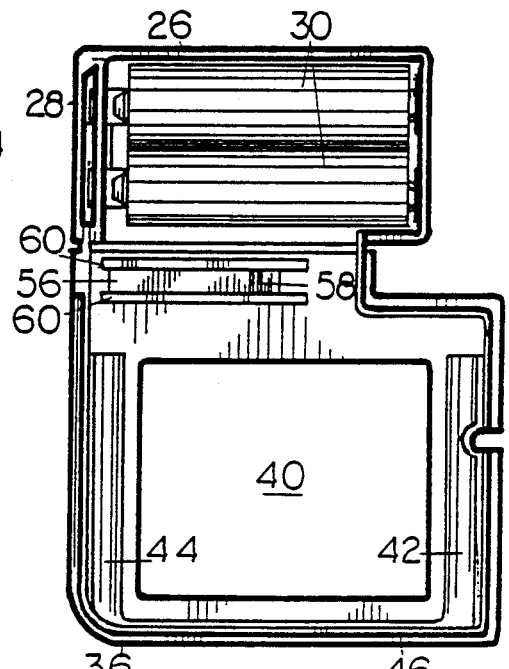
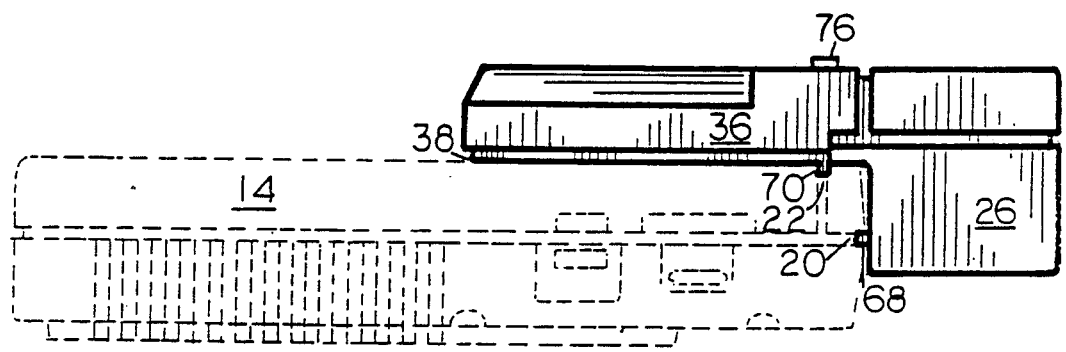

LIGHT APPARATUS FOR USE WITH A COMPACT COMPUTER VIDEO SCREEN

"This is a continuation of Ser. No. 07/678,265 filed on Apr. 19, 1991, now U.S. Pat. No. 5,091,832, which application is the national phase of International Application filed as PCT/U.S. 90/03966 filed on Jul. 11, 1990 and which designated the U.S."

BACKGROUND OF THE INVENTION

Compact computer apparatuses having video viewing screens are quite popular and typically comprise hand-held, portable, battery-operated devices which typically display information or play games employing a video screen, particularly a generally flat, liquid crystal display (LCD) screen. Such compact video computer apparatuses may include, but not be limited to: calculators, computer video games, lap top computers and other computers where a variety of software is employed. In particular, compact video games, such as the compact video game system known as GAME BOY TM (a trademark of Nintendo of America, Inc.), is a completely self-sustained video game system which may be operated by employing a collection from a library of software game packs. The Nintendo GAME BOY TM compact video game system provides a compact, self-contained, battery-operated, portable, hand-held computer with a cross key joy stick to operate the game and start and select buttons with an LCD-type screen, together with volume controls so as to display and enable the user to display images and play games.

While video display screens are employed and typically include a flat LCD-type screen, such LCD-type display screens are often difficult to observe by the user in partial light, particularly, for example, in semi-darkened rooms, automobiles, planes, trains, buses and the like due to the lack of illumination on the LCD screen to permit suitable contrast during use.

Therefore, it is desirable to provide a light apparatus to enhance the view of the video screens of compact video systems, particularly video systems employing a flat, LCD-type screen, such as for example, as illustrated by the Nintendo GAME BOY TM video game system.

SUMMARY OF THE INVENTION

The present invention relates to a light apparatus used with a compact computer video screen. More particularly, the invention concerns a portable, battery-operated, hand-held light apparatus for use with a portable, battery-operated, hand-held computer video screen system employing an LCD screen to enhance the user's viewer of the LCD screen.

The invention comprises a light apparatus particularly a portable, hand-held, battery-operated light apparatus for use in combination with a computer apparatus having a video screen, such as compact video game system, in order to enhance the display of the video screen. The light apparatus generally comprises a body section, such as a molded plastic top and bottom section, having a plurality of, for example generally four, spaced apart, generally perpendicular to the screen light-colored panels which define an open viewing area in the body, the open viewing area adapted to match, i.e. generally rectangular, the viewing area of the video screen of the compact video apparatus with which the light apparatus is to be employed. The side panels extend outwardly about the sides of the open viewing space and generally are perpendicular outwardly from the compact video game screen to be enhanced, and generally are white or a light color to reflect indirect lighting. The light apparatus includes a battery section for the placement of batteries as a power source and includes electrical wires extending from the battery and electrically connected to an off/on switch and hence to a pair of small light bulbs placed on either side of the side panels, the lights adapted to be powered by the batteries and operated by the off/on switch. The lights are placed on opposing sides of the panel section and while in operation provide indirect enhancement light which is reflected from the side panels onto the viewing screen of the video screen of the compact computer apparatus in use thereby enhancing viewing of the LCD screen.

In addition, the light apparatus includes means by which the body section, including the battery section, may be clipped directly on in a snap-on fashion or otherwise retained in and on the compact computer so that the open viewing space of the body section of the light apparatus may fit directly over the video screen whose image is to be enhanced by the light of the light apparatus. In connection with a particular compact computer video game system, the body section would include a battery light apparatus. In connection with a particular compact computer video game system, the body section would include a battery section at the top of the body section and which extends backwardly from the body section. The body section includes a pair of generally parallel, straight, spaced apart, molded-type ridges, which ridges are designed to fit in a snap-on fashion onto the molding or design grooves found on the face and at the top face of the Nintendo game system. One ridge extending from the bottom surface of the extended battery section snaps into a groove on the top of the Nintendo GAME BOY TM system so as to provide a snap-on light apparatus. Another ridge on the top back surface of the body section snaps into a groove on the top face surface of the Nintendo game system. In combination with the Nintendo GAME BOY TM system, the light apparatus when snapped on may be snapped directly in place or laterally slid to position for alignment of the open viewing space with the as to provide for alignment of the open viewing space with the LCD video screen or the GAME BOY TM video game system, and optionally, to provide the user with a visual view of the battery and viewing light of the face surface of the compact computer apparatus.

Broadly, the present invention is directed to a portable, battery-operated, compact light apparatus for providing indirect light and enhancing the user's view of the video screen in a compact, portable, battery-operated computer, such as a compact computer game video screen system, particularly where the video screen in composed of the LCD screen which is difficult to see in partial light or poor visibility conditions. The light apparatus of the invention comprises a box-like body with a plurality of surrounding side panels, typically light colored, such as white, and of short, defined depth, for example, about one-quarter inch, which defined in the body element and open video viewing space within the body with the element viewing space typically being generally rectangular in nature and adapted to conform to the size of the video screen in the compact apparatus in which the light apparatus is to be employed, so that the open video viewing space may be placed directly over the video screen, such as a 4×4¼ cm open viewing space to fit over a similar size video screen.

The light apparatus includes a battery compartment adapted to receive batteries as a source of power therein, typically for example four "AA" type batteries, with the battery compartment generally integrally formed into the plastic molded body and positioned in one preferred embodiment so that the battery compartment is at the top section of the body above the open video viewing space and which battery compartment extends slightly backwardly from the back surface of the body section so as to overhang the top surface at least in part of the compact computer apparatus in which the light apparatus is to be employed.

The light apparatus includes light means to light up one or preferably two or more directly opposing sides of the open viewing space with the open viewing space typically being defined by a plurality of light-colored side panels, generally four side panels, comprising a top and bottom panel generally four to the video viewing screen and two opposingly spaced apart generally sloping side panels on either side of the video viewing screen with typically a pair of light bulbs disposed one on each of the side panels. Preferably, a short extension adjacent the open viewing space on each of the opposing side panels is provided to provide for shielding of light from the light bulbs so that the light from the light bulbs will not impinge directly onto the LCD video screen, but rather be reflected from the sloping side panels to provide indirect light on to the LCD video screen. Of course, if desired, the lights may be employed without the need for direct lighting and so positioned to provide indirect lighting or employing different light bulbs, such as soft lights, or employing lights on all or one surfaces to provide the lighting necessary to enhance the video screen. The light apparatus includes electrical switch means, typically a sliding switch means, to provide off/on power with electrical wiring from the batteries in the battery compartment through the electrical switch means and to the light, with the electrical switch means typically comprising a sliding off/on switch which makes contact with a tension-biased metal bar which in the "on" position forces the metal bar to make contact and to light the light bulbs and in the "off" position to break the circuit.

In the light apparatus, the optical light system employed in combination is of considerable importance in providing view enhancement of the display screen. The light bulbs are a source of white light (filaments), the light bulb shields or tabs prevent concentrated light from illuminating directly the surface of the LCD screen, the white or light-colored walls about the screen diffuse the white light from the bulbs and the white finish is preferably a flat white rather than a glossy white finish to reflect a homogenous light onto the surface of the LCD display screen to eliminate uneven illumination of the display screen.

The light apparatus includes an attachment means to releasably secure the body of the light apparatus in a releasable manner to the compact computer apparatus and optionally so as to permit adjustment of the open viewing area of the light apparatus to be slid or positioned over the video screen of the compact computer apparatus and thereafter to be easily removed if desired where lighting conditions might change. Any releasable means to attach the body of the light apparatus onto the computer apparatus may be employed to include, but not limited to, for example, the employment of Velcro ® fasteners secured to the surface of the light apparatus and to the surface of the computer game apparatus.

More preferably in one defined embodiment herein, attachment means provides for a pair of space apart ridges on the light apparatus, such straight line ridges adapted to snap into a groove on the front surface of the video game apparatus and another ridge to snap from the bottom surface of the battery compartment into a groove onto the top surface of the computer game apparatus so as to provide a snap-on means of attaching the light apparatus onto the compact computer apparatus. The attachment means employing the raised ridges on the light apparatus are particularly adapted for use with the compact computer apparatus wherein there are corresponding grooves formed in the computer apparatus. In particular, the light apparatus as illustrated is designed to be employed with a compact computer apparatus and video games system known as the Nintendo GAME BOY ™ video game system whereby the compact computer apparatus with the LCD video screen contains a line groove extending across and close to the top surface of the video game system and another groove extending across the top surface of the video game system, thus enabling the light apparatus ridges to be snapped into place into said grooves and also enables the light apparatus to move slidably laterally for correct positioning of the open viewing area of the light apparatus over the LCD video screen.

The invention will be described for the purposes of illustration only in connection with certain preferred embodiments; however, it is recognized that various changes, modifications, additions and improvements may be made to the illustrated embodiments by those persons skilled in the art without departing from the spirit and scope of the invention.

BRIEF DESCRIPTION OF THE DRAWINGS

FIG. 2 is front elevational view of the light apparatus of the invention;

FIG. 3 is a back elevational view of the light apparatus of the invention;

FIGS. 4 and 5 are opposite side plan views of the light apparatus of the invention;

FIG. 6 is a top plan view of the light apparatus of the invention;

FIG. 7 is a bottom plan view of the light apparatus of the invention;

FIG. 8 is a front plan view in the open position of the bottom cover of the light apparatus of the invention;

FIG. 9 is a back plan view in the open position of the top cover of the light apparatus of the invention; and FIG. 10 is a side plan view of the light apparatus of the invention secured to a compact computer apparatus as shown in FIG. 1, with the computer apparatus shown in dotted lines.

DESCRIPTION OF THE EMBODIMENTS

Figure 1:
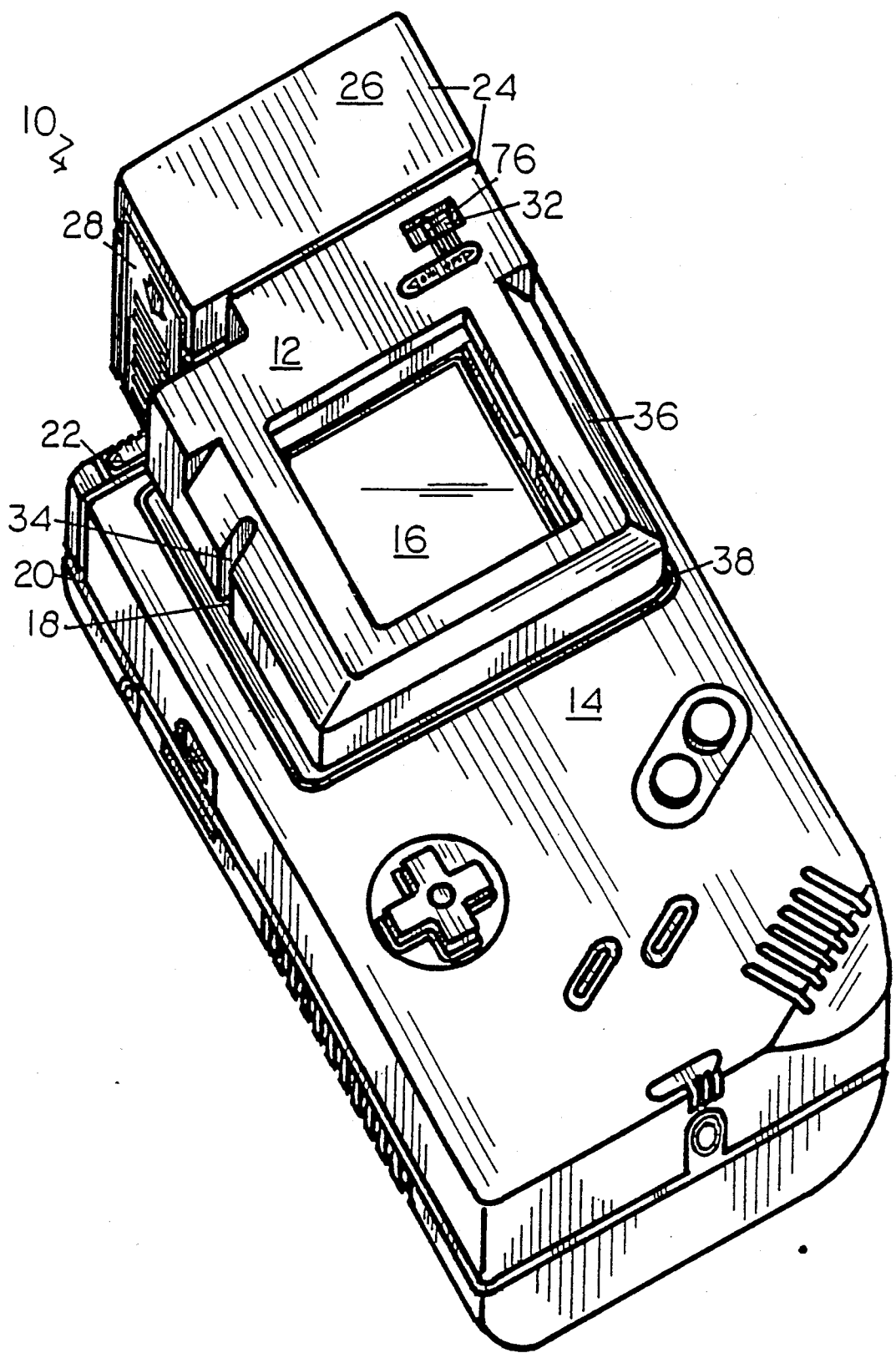
FIG. 1 is a perspective view from above showing the light apparatus of the invention in an attached position onto a compact computer apparatus.

FIG. 1 illustrates the light apparatus of the invention 12 in combination with a Nintendo GAME BOY ™ compact computer apparatus 14 having a LCD video screen 16. The computer apparatus 14 has a battery warning light section 18 on the front face to advise the user concerning the status of the battery and contains a recessed groove 20 around the side of the apparatus, apparently a design or molding line, and a top groove 22 on top front surface of the computer apparatus 14.

With reference to all of the drawings, the light apparatus 12 comprises a body section 24 having an integrally formed battery compartment 26 formed at the upper portion thereof and adapted to receive four "AA" batteries 30 as the source of power, the battery compartment having a slidable door 28 for retaining the batteries 30 in the battery compartment 26 in a electrical contact position, the battery compartment 26 extending outwardly from the back of the body 24 so that in the attachment position with the computer apparatus 14, the battery compartment can extend over at least a portion of the top surface of the computer apparatus 14. The light apparatus includes an off/on electrical switch 56 on the face thereof comprising a molded plastic, slidable off/on switch 56 having a raised, knurled, operating section 76 which extends outwardly from the front opening 32 in the body 24. The slidable plastic switch is located between two raised, molded plastic ridges 60 on the top molded cover 36. Such top molded cover is designed to fit matingly with the bottom molded cover 38. The light apparatus 12 includes a side recessed area 34 so designed as to fit over and expose to the viewer the battery warning light 18 on the face of the compact computer apparatus 14 so that the user may view the battery light as required.

The body 24 includes an open video space 40 which is designed to be of the same size as the LCD video screen 16 of the compact computer apparatus 14. The body 24 includes a pair of sloped or angled white colored side panels 42 and 44 and a top and bottom side panel 50 and the white or light colored extending directly generally perpendicular to the video screen 16 rather than sloped as illustrated for the side panels 42 and 44. The top side panel 50 is integral with and extends from the bottom molded section of the body 38 when the body sections 36 and 38 are matingly engaged to form the body 24, the top panel 50 with the panels 42, 44 and 46 on the top section 36 then form a rectangular, open video viewing space 40 of the apparatus.

The light apparatus includes a pair of light bulbs 52 placed on either side of sloping sides panels 42 and 44 and which side panels also include a short, solid, upward extending light shield 48 so as to prevent the direct glare of the light bulbs 52 onto the LCD screen and to provide for indirect lighting through reflection on the light-colored side panels 42, 44, 46 and 50 onto the LCD viewing screen 16. The light bulbs 52 are connected in parallel through wires 54 first to a spaced apart metal shorting bar 66 (shown in dotted lines) with the other connection going to an electrical bar 62 which is held in place by two raised, molded plastic pins 64 and which includes a spring-type metal, tensioned contact 72 whereby on movement of the off/on switch 56 electrical contact is made between the electrical wires 54 to the light bulbs 52 through the electrical metal bar 62 through wires 54 extending into the batteries 30. The electrical shorting bar 66 is connected in parallel to the light bulbs 52 and is spaced apart by an extending ridge 74 spaced just above the side panel 50.

The light apparatus 12 is secured to a compact computer game system 14, in particular the Nintendo GAME BOY TM system as illustrated by the use of a straight, raised, molded ridge 70 on the top back surface of the body section and a corresponding straight, raised, molded ridge 68 extending from bottom surface of the extending battery compartment 26 (see FIG. 10 in particular). The raised ridges 68 and 70 are designed to snap in to a matingly and slidable fashion into grooves 20 and 22 of the computer game apparatus 14 so that the light apparatus is then releasably attached to the front surface of the computer game apparatus 14 and may be easily slid through the ridges laterally to adjust the open space 40 of the light apparatus 12 into the LCD screen 16 of the computer game apparatus 14.

In operation, the light apparatus is then snapped on through the ridges 68 and 70 into grooves 20 and 22 of the apparatus 14, then slightly laterally adjusted if required so as to place the indent 34 directly over the battery warning light of apparatus 14 and to position the open viewing space 40 directly over and aligned with the LCD screen 16 and then moving the off/on switch to the "on" position to provide indirect lighting from bulbs 52 to the LCD screen when viewing the LCD screen of computer game system 14 in poor light conditions.

What is claimed is:

1. A portable, battery-operated, compact light apparatus for use in enhancing the view of a computer video screen, which light apparatus comprises:
   a) a body having a plurality of side panels which define an open video-viewing space within the body, the video-viewing space adapted to conform generally to the size of the compact computer video screen to be enhanced for viewing by the user;
   b) a battery compartment adapted to receive one or more batteries as a power source for the light apparatus;
   c) light means to light up one or more surfaces of the side panels to have light from said lighting means enhance the viewing of the compact computer video screen;
   d) electrical switch means to control the power from the power source;
   e) electrical connection means to connect the light means through the switch means to the battery compartment and to the batteries as a power source to be employed therein; and
   f) attachment means to secure releasably the body of the light apparatus directly onto the computer apparatus, so that the open viewing space of the light apparatus may be positioned over the video screen of the computer apparatus, and whereby the light enhances the view of the video screen in use by the user.

2. The apparatus of claim 1 wherein the battery compartment is secured to the top section of the body, and the bottom surface of the battery compartment extends outwardly beyond the back surface of the body.

3. The apparatus of claim 1 wherein the light means comprises first and second light bulbs positioned generally adjacent opposite side panels of the body, and which side panels include a shield section means, to shield the light bulbs from direct viewing and to reflect the light of the first and second light bulbs toward the side panels for reflection onto the video screen.

4. The apparatus of claim 1 wherein the attachment means comprises one or more raised ridge means on the body, the raised ridge means adapted to fit into a close, snap-in relationship with groove means on the compact computer apparatus, whereby the light apparatus may be retained with the compact computer apparatus and the open viewing space of the light apparatus positioned over the video screen of the compact computer apparatus.

5. The apparatus of claim 2 wherein the attachment means includes a first raised, straight ridge on the top back surface of the body and a second raised, straight ridge on the extended bottom surface of the battery compartment, the first and second raised ridge adapted to snap respectively into corresponding grooves on the top front and top surface of a compact computer apparatus, so as to attach the light apparatus to the compact computer apparatus.

6. The apparatus of claim 1 which includes batteries positioned in the battery compartment as a power source for the light means of the apparatus.

7. The apparatus of claim 1 wherein the body includes a plurality of light-colored side panels, and the light means is positioned to light up indirectly one or more surfaces of the side panels, to provide indirect reflected light onto the computer video screen.

8. The apparatus of claim 1 which includes four panels, to define the open viewing area, which include first and second side panels at an angle to the video screen, and top and bottom panels generally perpendicular to the video screen, to define a rectangular open viewing space.

9. The compact computer apparatus having a video screen for viewing by a user, and which includes releasably attached thereto the light apparatus of claim 16, with the open viewing space of the light apparatus positioned generally over the video screen of the compact computer apparatus.

10. The compact computer apparatus of claim 9 wherein the video screen comprises an LCD video screen.

11. A compact computer apparatus having an LCD video screen which includes releasably attached thereto, in a snap-on relationship, the light apparatus of claim 5.

12. The apparatus of claim 1 wherein the body has an opening therein, to permit the user to view a battery-warning light on the compact computer apparatus, when the light apparatus is attached to the compact computer apparatus.

13. A method of enhancing the viewing of an LCD video screen of a computer apparatus, which method comprises:

a) providing a battery-operated, portable light apparatus having an open viewing space adapted to be placed over the LCD video screen and indirectly lighting the open viewing space;

b) providing a computer apparatus having an LCD video screen which requires enhanced lighting for viewing in partial light conditions;

c) securing in a releasable manner the light apparatus onto the computer apparatus, with the open viewing space of the light apparatus positioned over the video-viewing screen; and d) indirectly lighting the video-viewing screen by lights in the light apparatus.

14. The method of claim 13 which includes providing a pair of spaced-apart, raised ridges in the light apparatus, and providing a compact computer apparatus having a pair of correspondingly spaced-apart grooves, and securing the light apparatus onto the computer apparatus by snapping the raised ridges into the grooves.

15. The method of claim 13 which includes providing ridge means on the light apparatus, and securing the light apparatus to the computer apparatus by the ridge means fitting into groove means on the compact computer apparatus.

16. The method of claim 30 which includes laterally sliding the light apparatus in relation to the computer apparatus, to position the open viewing space of the light apparatus directly over the video screen of the computer apparatus.

17. The method of claim 13 which includes providing a plurality of light-colored side panels in the light apparatus, to define the open viewing space, and indirectly lighting the video-viewing screen by reflected light from the side panels.

18. The method of claim 17 which includes tilting one or more opposite side panels, to reflect light onto the video-viewing screen.

19. The method of claim 13 wherein the light apparatus includes a battery compartment for one or more batteries as a power source for the lights of the light apparatus, and which method includes securing, in a releasable manner to the battery compartment, the computer apparatus.

20. The method of claim 13 which includes indirectly lighting the video-viewing screen of the computer apparatus by side-reflected light from the light apparatus.

* * * * *

UNITED STATES PATENT AND TRADEMARK OFFICE
CERTIFICATE OF CORRECTION

PATENT NO. : 5,130,907
DATED : July 14, 1992
INVENTOR(S) : Angelo Tortola, et. al.

It is certified that error appears in the above-indentified patent and that said Letters Patent is hereby corrected as shown below:

On the Title page, item [63] under Related U.S. Application Data should read-- This application is a continuation of Serial No. 678,265, filed April 19, 1991, now U.S. Patent 5,091,832, which is the national phase of PCT/US90/03966, filed July 11, 1990--.

Column 7, line 29, delete "16" and insert --1--.

Column 8, line 25, delete "30" and insert --15--.

Signed and Sealed this

Twenty-second Day of November, 1994

Attest:

BRUCE LEHMAN

Attesting Officer  Commissioner of Patents and Trademarks